United States Patent
Zeng

(10) Patent No.: US 7,963,181 B2
(45) Date of Patent: Jun. 21, 2011

(54) DRIVE FOR ADJUSTING PARTS OF SEATING AND RECLINING FURNITURE

(75) Inventor: Wenli Zeng, Guangdong (CN)

(73) Assignee: Man Wah Furniture Manufacturing (Huizhou) Co., Ltd., Man Wah Industrial Park, Guangdong (CN)

( * ) Notice: Subject to any disclaimer, the term of this patent is extended or adjusted under 35 U.S.C. 154(b) by 348 days.

(21) Appl. No.: 12/233,574

(22) Filed: Sep. 18, 2008

(65) Prior Publication Data

US 2010/0064830 A1 Mar. 18, 2010

(51) Int. Cl.
- F16H 3/06 (2006.01)
- F16H 27/02 (2006.01)
- F16H 29/02 (2006.01)
- F16H 29/20 (2006.01)
- B60N 2/02 (2006.01)
- B60N 2/30 (2006.01)

(52) U.S. Cl. .................................. 74/89.23; 297/362.11

(58) Field of Classification Search .................. 74/89.23, 74/89.32, 89.33; 297/362, 362.11, 362.12
See application file for complete search history.

(56) References Cited

U.S. PATENT DOCUMENTS

| | | | | |
|---|---|---|---|---|
| 5,444,880 | A | * | 8/1995 | Weismiller et al. ............... 5/424 |
| 5,747,896 | A | * | 5/1998 | Nagai et al. ..................... 310/20 |
| 5,927,144 | A | * | 7/1999 | Koch ........................... 74/89.36 |
| 6,588,289 | B2 | * | 7/2003 | Ung et al. ...................... 74/89.4 |
| 7,717,005 | B2 | * | 5/2010 | Wang ........................... 74/89.32 |
| 2002/0066327 | A1 | * | 6/2002 | Nagai et al. ................... 74/89.33 |
| 2009/0151488 | A1 | * | 6/2009 | Wang ........................... 74/89.32 |

* cited by examiner

*Primary Examiner* — Justin Krause

(57) ABSTRACT

A drive for adjusting parts of seating and reclining furniture is provided, which includes: an electric motor, disposed within a motor cover of a cabinet and engaged with a gear connected to a lead screw via one end of a drive shaft of the electric motor, and a slider, for moving rectilinearly back and forth in cooperation with the lead screw. The slider is provided with a drive nut therein, which is screwed onto the lead screw to enable the slider to move rectilinearly. One or more positioning grooves are disposed on the slider in parallel with the nut. Guide rails are correspondingly disposed in the positioning grooves. One end of each guide rail is fixed to the cabinet and the other end of each guide rail is fixed to a top stopper. Therefore, a better adjustability is achieved within a limited inner space of the furniture. Moreover, the drive does not need to move, and the stroke length of the drive is independent from the cabinet size thereof, so that the drive has a low manufacturing cost and is easily assembled.

3 Claims, 5 Drawing Sheets

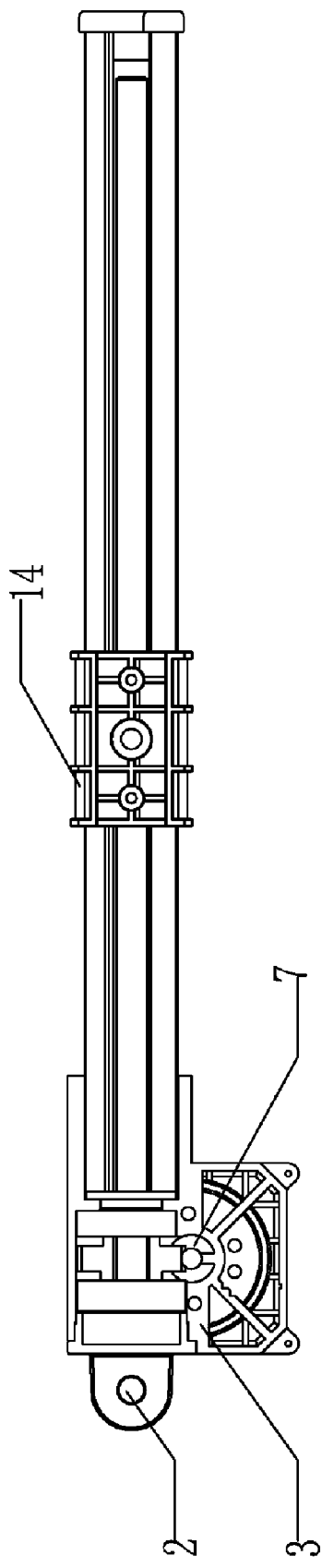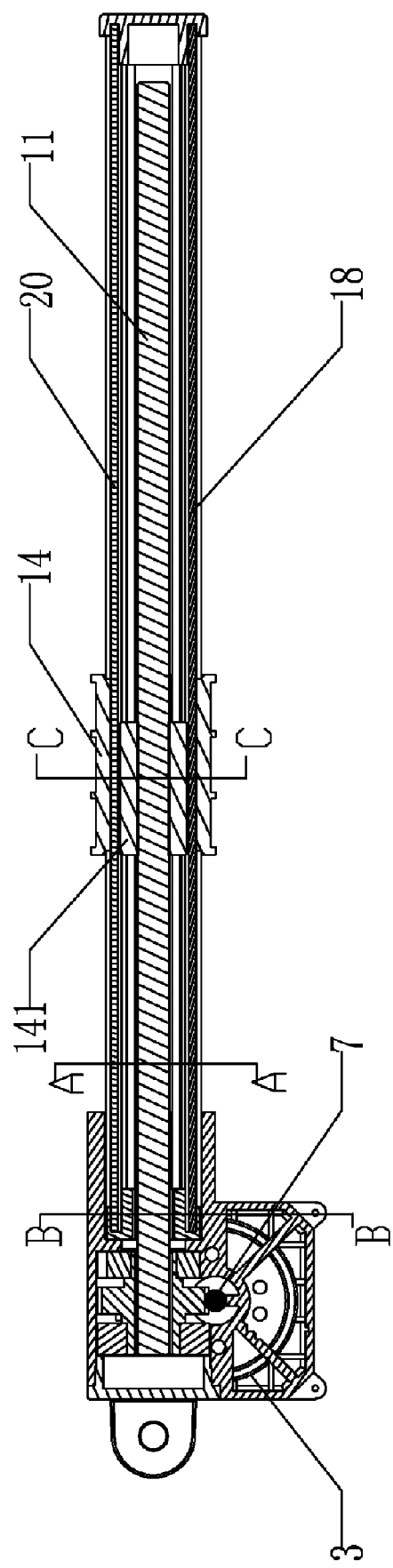
FIG. 2
FIG. 3

E-E

DRIVE FOR ADJUSTING PARTS OF SEATING AND RECLINING FURNITURE

BACKGROUND OF THE INVENTION

1. Field of the Invention

The present invention relates to a drive for adjusting parts of seating and reclining furniture, and more particularly to a drive applicable to a chair and sofa.

2. Related Art

A drive of this kind is known from DE-GM 89 03 603, in which a mechanism, consisting of a gear connected to a spindle and a worm engaging the gear, is arranged inside a housing. The worm is driven by an electric motor fastened to a side surface of the housing. A nut, on which a lifting tube capable of moving in a lifting tube receiving device is fastened, is guided in a non-twisting manner on the spindle within the lifting tube receiving device protruding from the housing. The lifting tube can be easily adjusted if this drive is fixed in a pivoting manner via the receiving device on the housing and the lifting tube is coupled with an adjuster for slatted bases.

Such a drive is particularly disadvantageous in that, its total length is determined by a necessary minimum length for guiding the lifting tube within the lifting tube receiving device plus a lifting path of the lifting tube. This minimum length is necessary in order to reliably prevent the lifting tube from bending over a long travel paths. This means that it is necessary to simultaneously prolong the lifting tube receiving device while increasing the stroke length of the lifting tube. Therefore, it is necessary to manufacture housings with different lengths of lifting tube receiving device within certain limits, and as a result, the manufacturing of the drives becomes considerably expensive.

Furthermore, such drive cannot be used in constricted spaces unobtrusively, for example, in adjustable seating and reclining furniture.

Moreover, an adjuster has been disclosed in DE 37 34 922 A1, which is designed to be adjustable in a longitudinal direction on a special section tube by means of a nut/spindle mechanism. The nut part located within the special section tube is designed in one piece, including a sliding shell that partially surrounds the special section tube and strips guided in grooves within the special section tube. A web that reaches through the groove within the special section tube and connects these parts is provided between the nut and the sliding shell. As the sliding shell only partially surrounds the special section tube, an additional sliding support is provided, and the sliding shell and the sliding support are screwed together. A large number of individual parts definitely require considerable efforts during assembling, and meanwhile result in an increased cost.

SUMMARY OF THE INVENTION

Accordingly, the present invention is directed to a drive for adjusting parts of seating and reclining furniture to overcome the deficiencies in the prior art, which has a low manufacturing cost, is easily assembled, and a stroke length thereof can be adjusted independently.

In order to achieve the above objectives of the present invention, the following technical solutions are adopted.

A drive for adjusting parts of seating and reclining furniture is provided. The drive includes: an electric motor, disposed within a motor cover of a cabinet and engaged with a gear connected to a lead screw via one end of a drive shaft of the electric motor; and a slider, for moving rectilinearly in cooperation with the lead screw. The slider is provided with a drive nut therein, which is screwed onto the lead screw to enable the slider to move rectilinearly. One or more positioning grooves are disposed on the slider in parallel with the nut. Guide rails are correspondingly disposed within the positioning grooves. One end of each guide rail is inserted into a rear retainer and then fixed to the cabinet together with the rear retainer, and the other end of each guide rail is fixed to a top stopper.

A front retainer is further disposed between the top stopper and the guide rails.

The gear engaged with the shaft of the electric motor is sleeved with a non-standard bearing on one end thereof and sleeved with another bearing on the other end thereof. The lead screw is screwed into the gear.

The slider is disposed with a connecting device for matching with an external transmission device.

The transmission device is a rocker and a connecting rod for rotating about an end point of the rocker in cooperation with the rocker. The connecting rod is connected to one part of the seating and reclining furniture under adjustment.

The cabinet is disposed with a rear cover at one end away from the lead screw. A lug is disposed on the rear cover in a manner of being connected to and cooperating with a rear cover stopper fixed on a reclining frame. The lug is configured in one pair parallel to each other and spaced apart by a certain distance, each of which has a mounting hole in the center thereof.

A center plate serving to control the drive is disposed in the cabinet. A plug fastener for fixing a plug is disposed at a lead hole of the center plate on the cabinet.

One of the guide rails is disposed with a groove on one side surface thereof. The groove is provided for accommodating start-stop stroke switches that are used for controlling operations of the electric motor.

The groove of the guide rail is disposed with an end cover for enclosing the groove.

Through the above technical solutions, the present invention has the following beneficial effects.

The drive of the present invention has a better adjustability within a limited inner space of the furniture. Moreover, the drive does not need to move, and the stroke length of the drive is independent from the cabinet size, so that the drive has a lower manufacturing cost and is easily assembled.

BRIEF DESCRIPTION OF THE DRAWINGS

The present invention will become more fully understood from the detailed description given herein below for illustration only, and thus is not limitative of the present invention, and wherein:

FIG. 2 is a front view of a drive for adjusting parts of seating and reclining furniture according to the present invention;

FIG. 3 is a sectional view of a drive for adjusting parts of seating and reclining furniture according to the present invention;

DETAILED DESCRIPTION OF THE INVENTION

Figure 1:
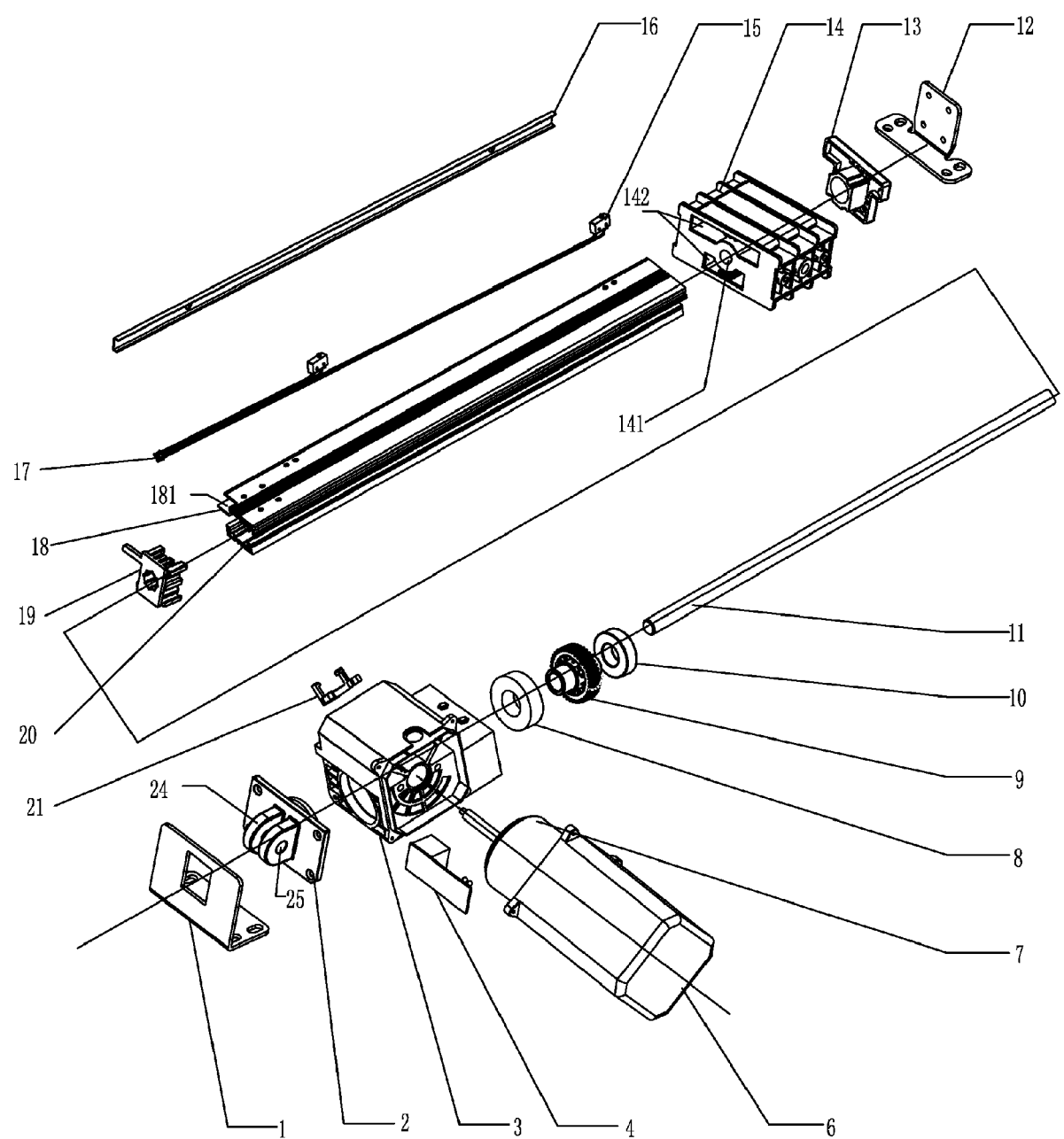
FIG. 1 is a three-dimensional assembled view of a drive for adjusting parts of seating and reclining furniture according to the present invention.
Figure 4:
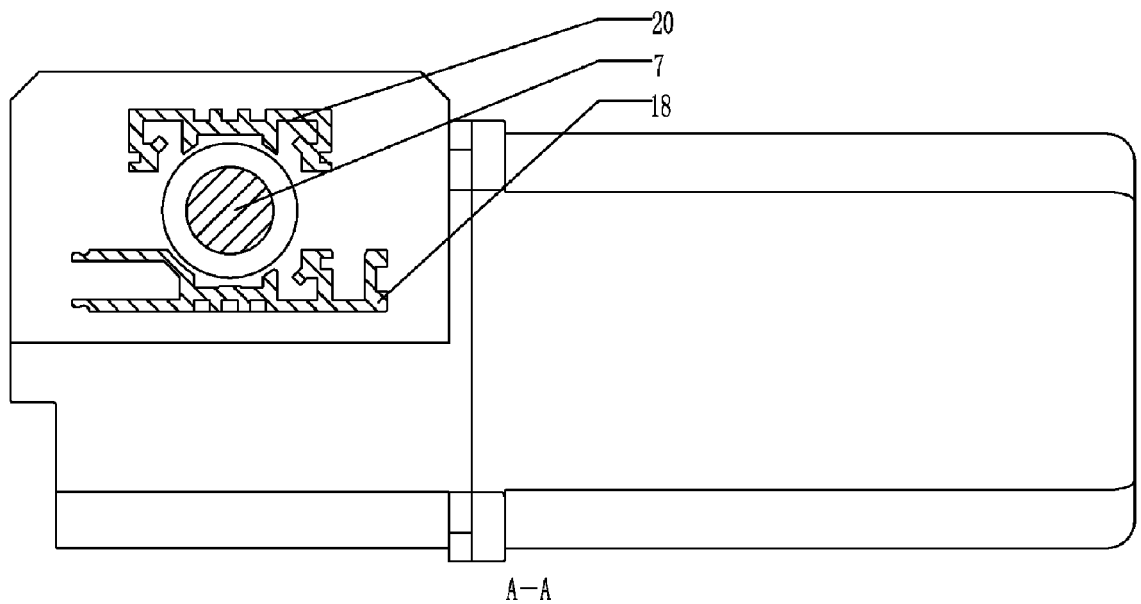
FIG. 4 is a sectional view of a drive for adjusting parts of seating and reclining furniture according to the present invention, taken along A-A in FIG. 3.
Figure 5:
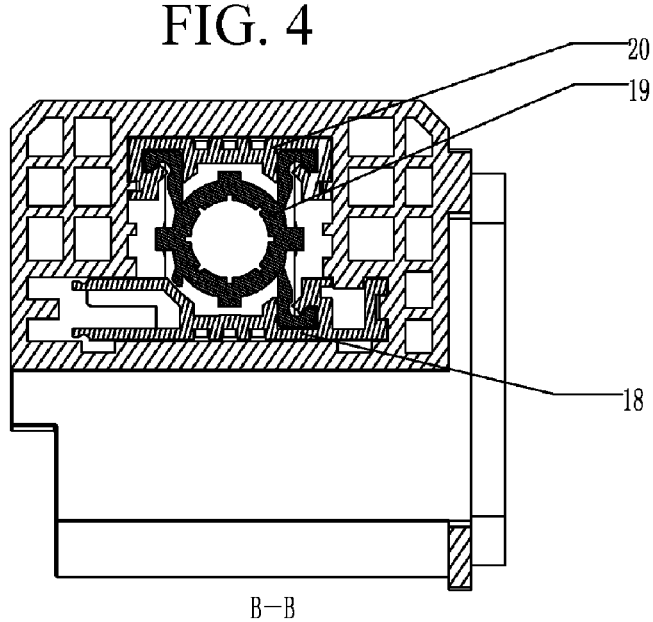
FIG. 5 is a sectional view of a drive for adjusting parts of seating and reclining furniture according to the present invention, taken along B-B in FIG. 3.
Figure 6:
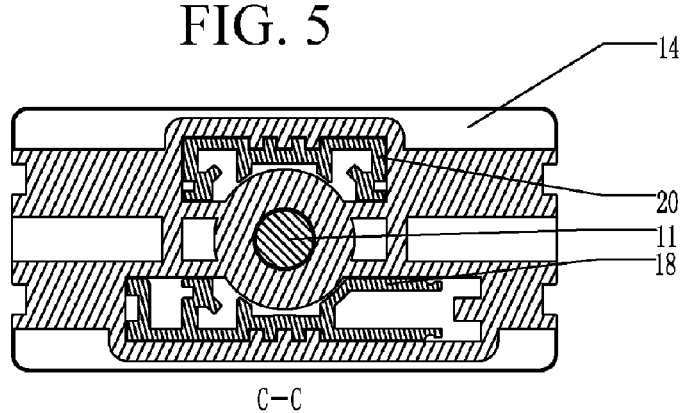
FIG. 6 is a sectional view of a drive for adjusting parts of seating and reclining furniture according to the present invention, taken along C-C in FIG. 3.

The present invention is described in detail below with reference to the accompanying drawings.

Referring to FIGS. 1 to 8, a drive for adjusting parts of seating and reclining furniture according to the present invention comprises: a cabinet 3 with a side providing a motor cover 6, another side providing an end opening, and a further side providing a box opening extending outward, an electric motor 7 disposed within the motor cover 6, a gear 9 disposed in the cabinet 3 driven by the motor 7, a lead screw 11 with an end thereof axially engaging with the gear 9 and a slider 14 moving rectilinearly back and forth in cooperation with the lead screw. The slider 14 is provided with a drive nut 141 engaging with the lead screw 11 to enable the slider to move rectilinearly. Two positioning grooves 142 are disposed on the slider next to two opposite sides of the nut. An upper guide rail 18 and a lower guide rail 20 are correspondingly disposed to pass through the positioning grooves 142 respectively. The upper guide rail 18 is disposed with a groove 181 on one side surface thereof. The groove 181 is provided for accommodating stroke switches 15 that are used for controlling operations of the electric motor. One end of each of the two guide rails 18, 20 is attached to a rear retainer 19 in the cabinet 3 (See FIG. 3) and the other end of each of the guide rails 18, 20 is attached to a front retainer 13 which is further fixed to a top stopper 12 (See FIG. 1). That is, the front retainer 13 is disposed between the top stopper 12 and the guide rails 18, 20. The gear 9, which is driven by the electric motor 6, has a threaded axial hole and two cylinderical bearing seats oppositely extending outward for being sleeved with a bearing 8 and another bearing 10 respectively The threaded axial hole of the gear 9 engages with an end of the lead screw 11 such that the lead screw 11 is capable of rotating with the gear 9 when the gear 9 is driven by the motor 7.

Figure 7:
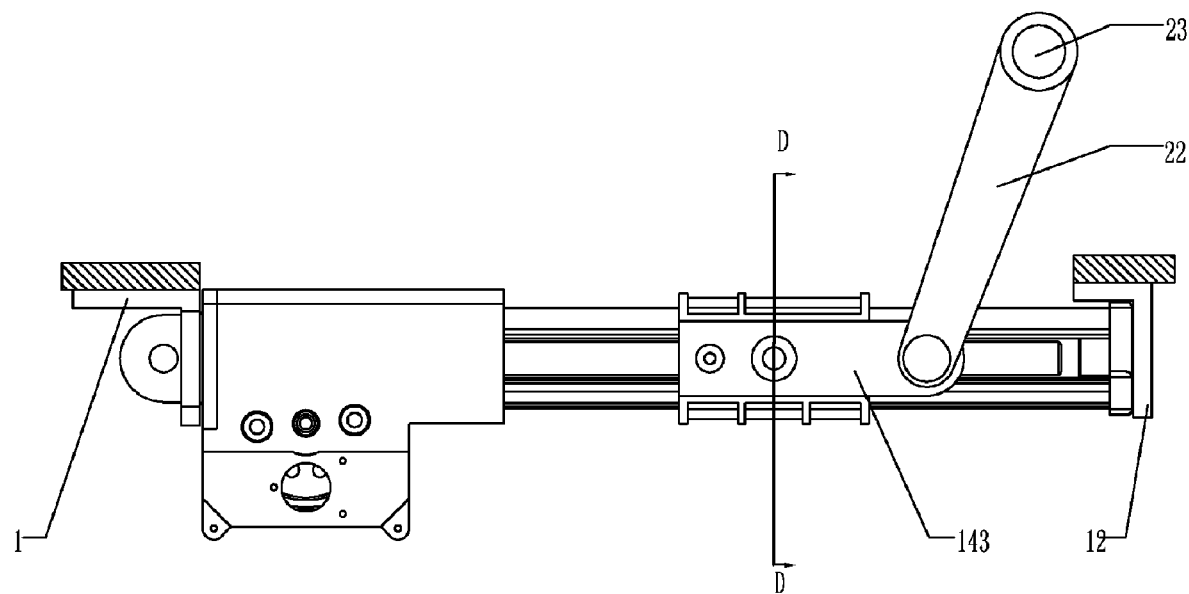
FIG. 7 is a schematic view of a first connection mode among a drive for adjusting parts of seating and reclining furniture, an transmission device, and a rear cover stopper according to the present invention.
Figure 8:
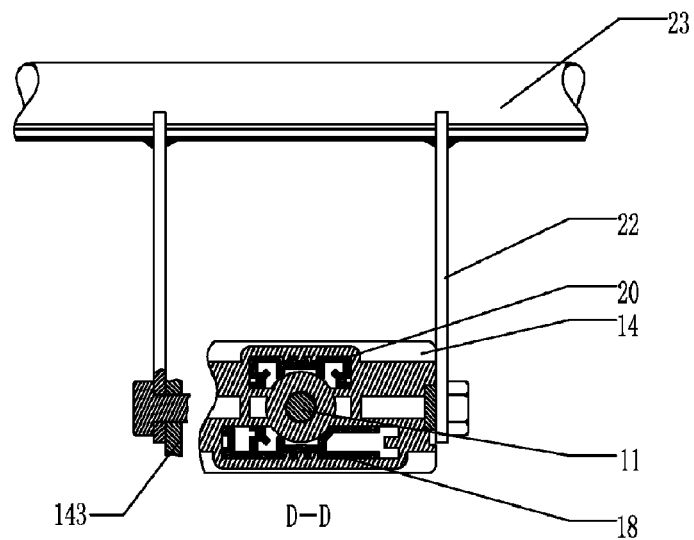
FIG. 8 is a sectional view taken along D-D in FIG. 7.

The slider 14 is disposed with a connecting device 143 for matching with an external transmission device. The transmission device has a rocker 22 and a connecting rod 23. The connecting rod 23 is connected to one part of the seating and reclining furniture. One end of the rocker 22 is rotatably connected to the connecting rod 23, and the other end of the rocker 22 is fixed to the connecting device 143 on the slider 14. The connecting device 143 is a protrusion on the slider 14 and has a through hole in the center thereof, as shown in FIGS. 7 and 8. In addition, the cabinet 3 is disposed with a rear cover 2 at one end away from the lead screw 11. A pair of parallel lugs 24 are disposed on the rear cover 2 in a manner of being connected to and cooperating with a rear cover stopper 1 fixed to a reclining frame on the furniture (not shown). The lugs 24 have a mounting hole 25 in the center thereof respectively. The lugs 24 are attached to the rear cover stopper 1, and the rear cover stopper 1 is fixed to the furniture (not shown). In addition, a center plate 4 serving to control the drive is disposed in the cabinet 3. A plug fastener 21 for fixing a plug is disposed at a lead through-hole provided at the center plate 4 (not shown). The groove 181 of the upper guide rail 18 is disposed with an end cover 16 for closing the groove 181.

During assembly, an end of the lead screw 11 is screwed into the axial threaded hole of the gear 9. Then, the bearing 8 is mounted to one of the bearing seats of the gear 9, and the bearing 10 is mounted to the other one of the bearing seats of the gear 9. Then, the obtained gear and bearing assembly is inserted into the cabinet 3 via the end opening of the cabinet 3, and the end opening is covered with the rear cover 2. Then, the rear retainer 19, which has a threaded center hole, is sleeved onto the lead screw 11 next to the gear and bearing assembly against the inner wall of the cabinet 3, and the slider 14 is screwed onto the lead screw 11. Then, the stroke switches 15 are installed and locked within the groove 181 of the upper guide rail 18, and then, the end cover 16 covers the groove 181. One end of the upper guide rail 18 with the end cover 16 passes through the slider 14 via one of the positioning grooves 142, one end of the lower guide rail 20 passes through the slider via the other one of the positioning grooves 142, and the preceding ends are snapped with the front retainer 13. The other ends of the guide rails 18, 20 are fastened to the rear retainer 19 and inserted into the cabinet 3 together via the box opening and locked in place with screws. A top stopper 12 is snapped to the front retainer 13. Afterwards, the center plate 4 is inserted into the cabinet 3 and the electric motor 7 is engaged to the cabinet 3. Then, the motor cover 6 is mounted to the cabinet 3, and the plug fastener 21 is locked to the cabinet 3. Finally, the rear cover stopper 1 is snapped to a lug seat at the roots of the lugs 24 of the rear cover.

In usage, once being powered on, the electric motor drives gear to rotate the lead screw. Under the motion of the lead screw, the nut in the slider is translated on the lead screw to enable the slider to translate on the guide rails. Since two stroke switches are disposed in the groove of the upper guide rail, the operations of the electric motor are controlled by the two stroke switches, thereby controlling the translation distance of the slider. Since one end of the transmission device is fixed to the slider, the rocker of the transmission device is driven to move at the same time as the slider is moved. The movement of the rocker drives the connecting rod to rotate at a certain angle, thereby driving the reclining part of the furniture to move.

Figure 9:
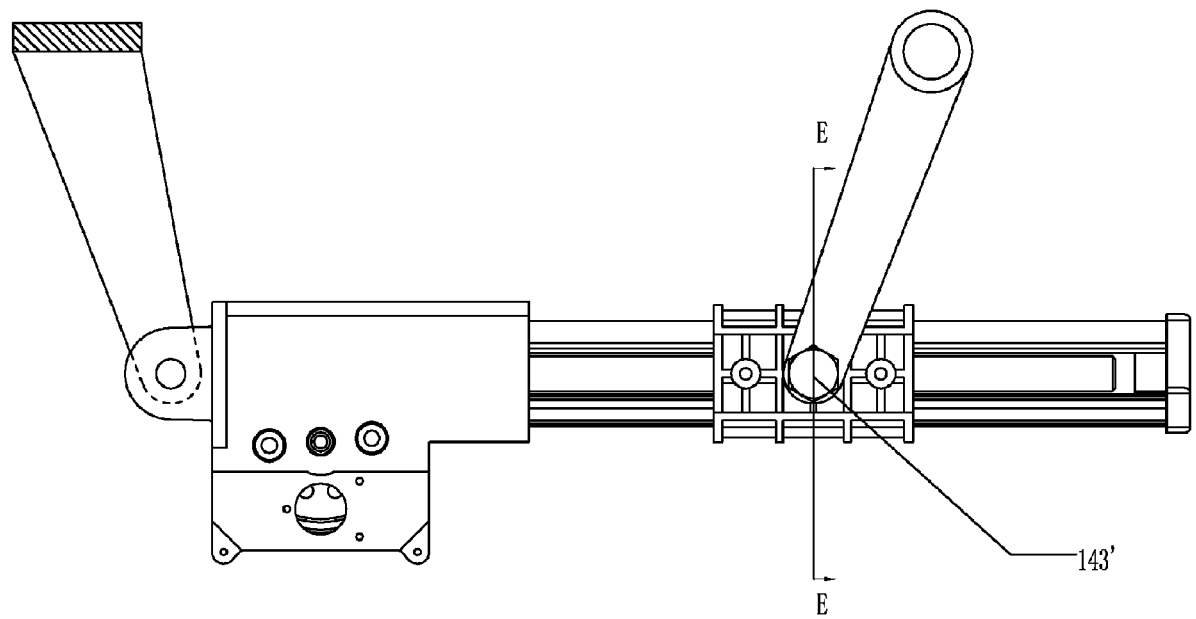
FIG. 9 is a schematic view of a second connection mode among a drive for adjusting parts of seating and reclining furniture, an transmission device, and a holding arm according to the present invention.
Figure 10:
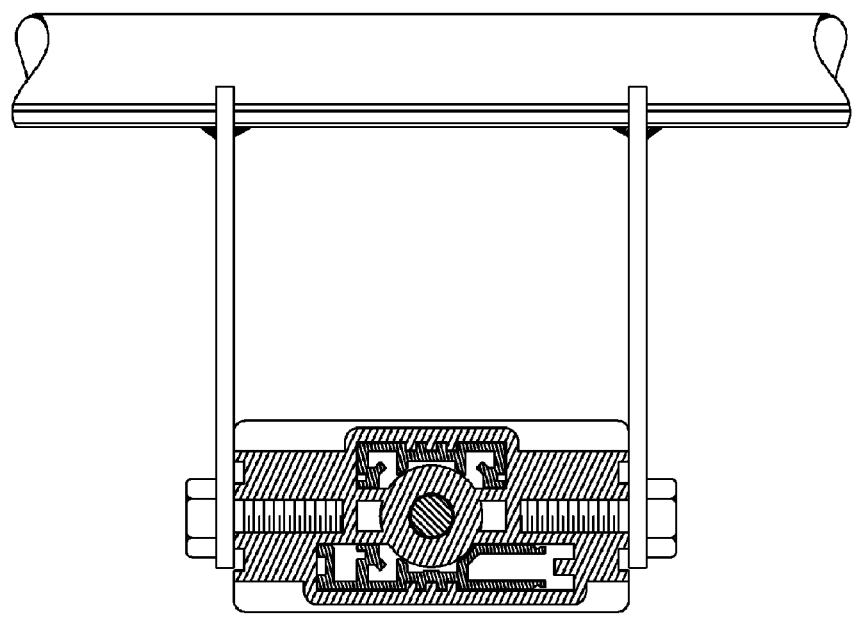
FIG. 10 is a sectional view taken along E-E in FIG. 9.

Alternatively, as for the drive for adjusting parts of seating and reclining furniture, the rocker of its transmission device may be fixed to a connecting device 143' at another position on the slider, as shown in FIGS. 9 and 10. Compared with the first embodiment, the transmission device here is also a small protrusion having a through hole in the center thereof. However, it is not connected to the middle position of the slider via an iron sheet protruding from the connecting rod. Instead, the rocker is directly connected to the middle position of the slider.

Definitely, the number of the guide rail may also be one rather than two, and the sectional shape of the guide rail may be either round or square. Some ribs matching with the slider may be disposed on the surface of the guide rail, and grooves may be correspondingly disposed on the slider, thereby achieving a more reliable engagement.

Compared with the prior art, the present invention enables the slider to slide on the lead screw to drive the transmission device, thereby adjusting the elevation of the reclining part of the furniture. Therefore, a relatively better adjustability is achieved within the limited inner space of the furniture. Moreover, the drive does not need to move, and the stroke length of the drive is independent from the cabinet size thereof, so that the drive has a low manufacturing cost and is easily assembled.

What is claimed is:

1. A drive for adjusting parts of seating and reclining furniture comprising:
   a cabinet having a first side attached to a motor cover, a second side providing an end hole attached with a cover, and a third side providing a box opening extending outward;
   an electric motor disposed within the motor cover;
   a gear having two opposite cylindrical bearing seats and an axial threaded through hole, and being placed inside the cabinet next to the motor via the end hole for being driven by the motor;
   a lead screw having one end engaging with the axial threaded through hole, and having another end extending outward via the box opening;
   a slider having a drive nut therein to engage with the lead screw to enable the slider to move rectilinearly, and having two positioning grooves disposed next to two opposite sides of the nut;
   two guide rails correspondingly disposed to pass through the positioning grooves with one end of each of the guide rails extending into the cabinet next to the gear, and the other end of each of the guide rails extending along the lead screw, and one of the guide rails having a side groove closed with an end cover;
   an L-shaped first stopper being attached to the cover;
   an L-shaped second stopper being disposed at the other ends of the guide rails;
   a reclining frame being disposed on the furniture and fixing with the first and second stopper;
   wherein the ends of the guide rails in the cabinet are fastened to a first retainer which has a threaded hole to sleeve onto the lead screw against an inner wall of the cabinet, and the other ends of the guide rails are attached to a second retainer which is further snapped to the second stopper.

2. The drive for adjusting parts of seating and reclining furniture according to claim 1, wherein the bearing seats are sleeved with a bearing respectively.

3. The drive for adjusting parts of seating and reclining furniture according to claim 1, wherein the cover for covering the end hole has a pair of lugs with a mounting hole in the centers thereof.

* * * * *